(12) United States Patent
Welkers et al.

(10) Patent No.: US 6,429,153 B1
(45) Date of Patent: Aug. 6, 2002

(54) TEXTILE COMPOSITE MATERIAL

(75) Inventors: Hans Welkers, Gescher; Bernhard Büning, Stadtlohn, both of (DE)

(73) Assignee: Huesker Synthetic GmbH & Company, Gescher (DE)

( * ) Notice: Subject to any disclaimer, the term of this patent is extended or adjusted under 35 U.S.C. 154(b) by 0 days.

(21) Appl. No.: 08/981,130

(22) PCT Filed: May 31, 1996

(86) PCT No.: PCT/EP96/02352
§ 371 (c)(1),
(2), (4) Date: Nov. 25, 1997

(87) PCT Pub. No.: WO96/38634
PCT Pub. Date: Dec. 5, 1996

(30) Foreign Application Priority Data

Jun. 1, 1995 (DE) ..................................... 295 09 066 U

(51) Int. Cl.$^7$ ........................... B32B 5/26; B32B 21/14; D04H 3/05
(52) U.S. Cl. .......................... 442/35; 442/305; 442/309; 442/313; 442/319; 442/366; 442/381; 405/302.7
(58) Field of Search .......................... 442/35, 305, 309, 442/319, 366, 381, 57, 313, 367, 368, 369; 428/114; 405/15, 36, 52, 302.4, 302.7

(56) References Cited

U.S. PATENT DOCUMENTS

| | | | | |
|---|---|---|---|---|
| H90 H | * | 7/1986 | Kumar | 66/192 |
| 3,816,231 A | * | 6/1974 | Marshall | 19/145 |
| 4,277,527 A | * | 7/1981 | Duhl | 428/109 |
| 4,435,467 A | * | 3/1984 | Rogers | 428/254 |
| 4,450,196 A | * | 5/1984 | Kamat | 156/148 |
| 4,472,086 A | * | 9/1984 | Leach | 405/258 |
| 4,497,863 A | * | 2/1985 | Cogan, Jr. | 428/253 |
| 4,518,640 A | * | 5/1985 | Wilkens | 428/102 |
| 4,980,930 A | * | 1/1991 | Cusimano | 2/220 |
| 5,065,599 A | * | 11/1991 | Groshens | 66/84 A |
| 5,194,320 A | * | 3/1993 | Groshens | 428/230 |
| 5,201,497 A | * | 4/1993 | Williams et al. | 256/12.5 |
| 5,236,769 A | * | 8/1993 | Paire | 428/196 |
| 5,241,709 A | * | 9/1993 | Kufner et al. | 2/268 |
| 5,294,479 A | * | 3/1994 | Longo | 428/236 |
| 5,424,110 A | * | 6/1995 | Tornero et al. | 428/114 |
| 5,436,064 A | * | 7/1995 | Schnegg et al. | 428/234 |
| 5,726,107 A | * | 3/1998 | Dahringer et al. | 442/414 |
| 5,795,835 A | * | 8/1998 | Bruner et al. | 442/310 |
| 5,866,229 A | * | 2/1999 | Gartner et al. | 428/366 |
| 6,020,275 A | * | 2/2000 | Stevenson et al. | 442/189 |
| 6,171,984 B1 | * | 1/2001 | Paulson et al. | 405/107 |

FOREIGN PATENT DOCUMENTS

| | | | |
|---|---|---|---|
| DE | 2217150 | 10/1973 | |
| DE | 3728255 A1 | 3/1989 | |
| DE | 3728255 A | * 3/1989 | E02B/11/00 |
| DE | 295 09 066 U1 | * 10/1995 | D04H/1/45 |
| EP | 510682 A1 | * 10/1992 | D03D/15/00 |
| JP | 57-96114 A | 6/1982 | |
| JP | 59-88540 | 5/1984 | E02D/17/20 |
| JP | 5988540 | 5/1984 | |

OTHER PUBLICATIONS

International Preliminary Examination Report for PCT/EP96/02352 published Apr. 7, 1998.

* cited by examiner

Primary Examiner—Cheryl A. Juska
(74) Attorney, Agent, or Firm—Jenkins & Wilson, P.A.

(57) ABSTRACT

The invention relates to a textile composite material used to stabilize, consolidate or reinforce soils and layers of earth, and which can also be used as a load-carrying drainage or filtering layer and comprises at least one nonwoven fabric (1). The disadvantage of nonwovens, used alone or in textile composites made of various plastic nonwovens, lies in their limited load-carrying capacity. To create a low cost textile composite material comprising at least one nonwoven fabric, having a high tear resistance in a main load direction and the ability to absorb high tensile forces without undue stretching, exclusively parallel, straight, load-carrying plastic filament yarns (2) are knitted, sewed or Raschel-knitted onto the nonwoven (1).

7 Claims, 1 Drawing Sheet

TEXTILE COMPOSITE MATERIAL

FIELD OF THE INVENTION

The invention relates to a textile composite material used to stabilize, consolidate or reinforce soils and layers of earth and as a load-carrying filtering layer, e.g. to cover a drainage layer, and comprising a nonwoven.

BACKGROUND ART

Nonwovens, especially plastic nonwovens, are used frequently in geotechnical engineering—for example, in waste impoundment construction—and in hydraulic engineering to separate two layers of soil having different particle size distributions. Different filtration characteristics can be obtained, depending on the thickness and strength of the nonwoven. Plastic nonwovens made from coarse fibers are suitable for use as drainage layers and are often combined with filtering nonwovens.

The disadvantage of nonwovens, used alone or in textile composites made of various plastic nonwovens, lies in their limited load-carrying capacity. Compared to textiles made of filament yarns (e.g. wovens or knits), nonwovens have much greater stretchability with lower tear resistance. Even textiles such as wovens and knits that possess high tear resistance, which are also used in geotechnical engineering, usually exhibit unfavorable load-carrying behavior, since the application of forces to such textiles initially causes elongation of the material due to the stretching of the yarns, which extend in curved paths as a result of the stitch formation or interweaving. Higher load-carrying capacity develops only after the material has undergone considerable stretching.

DE-A 37 28 255 discloses a ground anchoring strip that includes a loose nonwoven as a drainage material, fastened to the upper side of which, by clamping or sewing, is a textile strip comprising tensile-load-carrying warp strands. The textile strip must be manufactured on a weaving or knitting machine in a separate production step and then brought together with and joined to the nonwoven in a second production step.

SUMMARY OF THE INVENTION

The task of the invention is to create a low-cost textile composite material comprising at least one nonwoven fabric and which exhibits high tear resistance in a main load direction and can absorb high tensile forces without undue stretching.

This task is accomplished according to the invention in that exclusively parallel, load-carrying, straight, plastic filament yarns are woven, knitted, sewed or Raschel-knitted onto the nonwoven.

In the use of textile composites in geotechnical and hydraulic engineering, there is nearly always a fly established main load direction, e.g. the direction of inclination of a slope. By the simple expedient of applying exclusively parallel, straight, load-carrying strands made of plastic material, the textile composite material can be rendered highly tear-resistant in one direction, the main load direction. Since the strands lie straight against the nonwoven, when force is applied they are immediately stretched in opposition to their intrinsic elasticity, rather than being initially stretched with much lower resistance, as in the case of wovens and knits.

The plastic filament yarns extending in the warp direction can be applied to the nonwoven inexpensively, on sewing, knitting or Raschel-knitting machines, in a width that corresponds to the width of a web of nonwoven. Suitable plastic filament yarns can be selected according to the field of application and the required load-carrying capacity of the textile composite. One especially low-cost solution is to use split polypropylene yarn as the load-carrying strand and optionally also as the binding yarn for fastening the load carrier to the nonwoven, which can also be made of polypropylene.

The cross section of the strands can range from 2 to 100 $mm^2$, depending on the material of the load-carrying strands and the distance therebetween. The load-carrying strands preferably have a cross section of 4 to 50 $mm^2$ and are separated by a distance of 1 to 100 mm.

In an especially preferred embodiment of the invention, the load-carrying strands are Raschel-knitted onto the nonwoven in respective pairs, the distance between two pairs being 1 to 100 mm. This reduces the amount of binding yarn needed to secure the load-carrying strands. Of course, the connection between the nonwoven and the load-carrying strands is looser in this case than when the load-carrying strands are fastened individually, but such fixing of the load-carrying strands to the nonwoven is adequate. Once installed, both the load-carrying strands and the nonwoven are held in position by the pressure of the superjacent layers of earth.

BRIEF DESCRIPTION OF THE DRAWINGS

Further features and advantages of the invention will emerge from the following description of the drawings, which show.

DETAILED DESCRIPTION OF THE INVENTION

Figure 1:
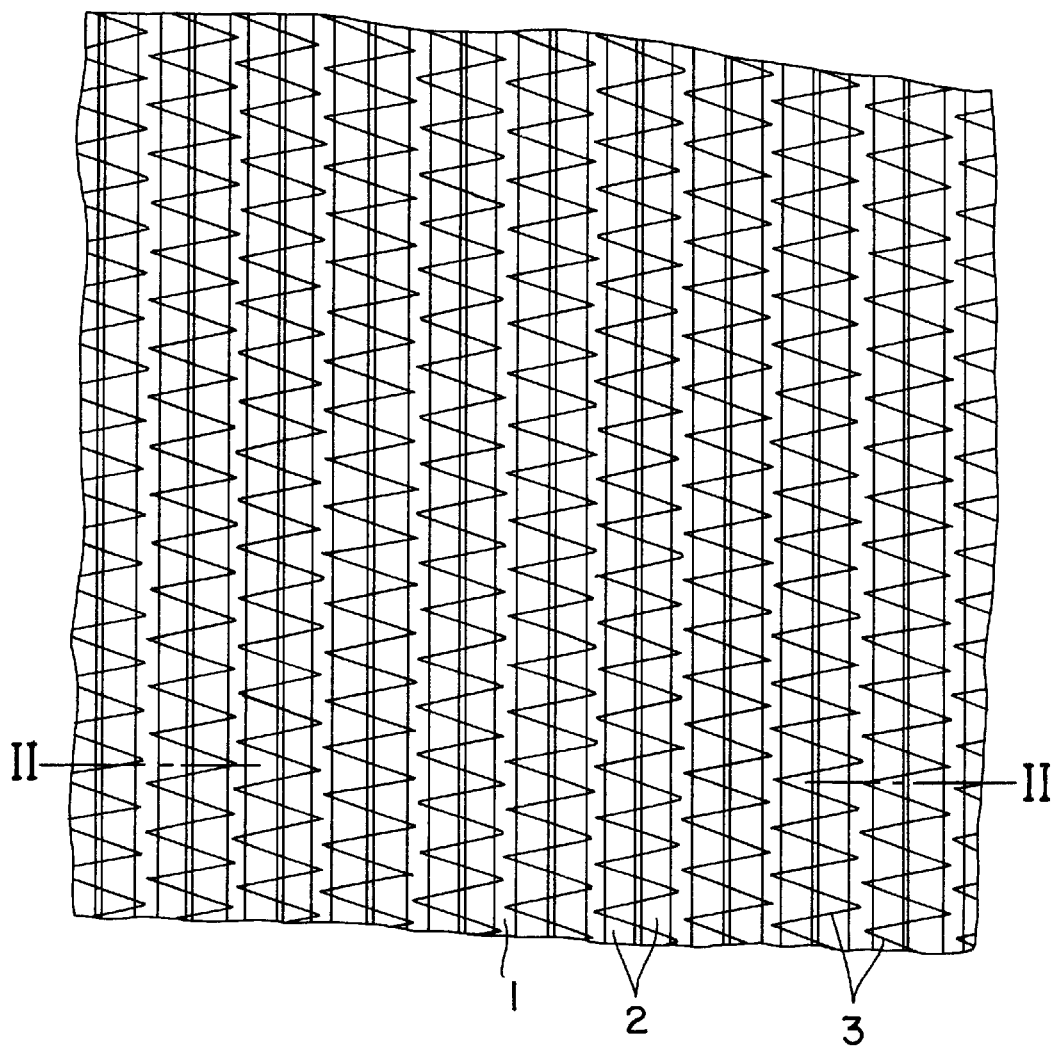
FIG. 1 a plan view of an embodiment of the textile composite material according to the invention, and FIG. 2 the textile composite material of FIG. 1, cut along section line II—II.
Figure 2:
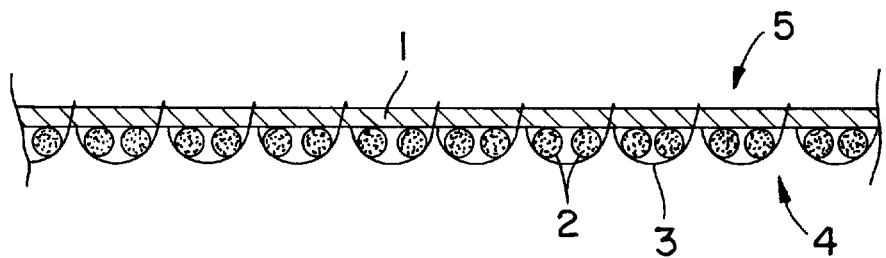

The textile composite material depicted in FIGS. 1 and 2 comprises a nonwoven 1, This nonwoven 1 can be made of natural materials such as coconut or hemp fiber, or alternatively of plastic fiber, especially polyester, polypropylene or polyethylene fiber. Raschel-knitted onto one side 4 of the nonwoven 1 are paired load-carrying strands 2 of split polypropylene yarn. The strands 2 of split polypropylene yarn are about 3 mm in diameter and are guided onto a Raschel knitting machine as the warp and placed on the nonwoven 1. A thin binding yarn 3 is guided onto the Raschel knitting machine as a looping warp. Each course of loops overlaps two strands 2 on side 4 of the nonwoven 1 and on the other side 5 of the nonwoven 1 comprises the links to the adjacent course.

LIST OF REFERENCE NUMBERS

1 Nonwoven
2 Load-carrying strands
3 Binding yarn
4 Face side
5 Reverse side

What is claimed is:

1. A textile composite material used to stabilize, consolidate or reinforce soils and layers of earth and as a load-carrying drainage or filtration layer, the textile composite material comprising at least one nonwoven (1) having only unidirectional tensile load-carrying plastic filament yarns (2)

knitted, sewed or Raschel-knitted to the nonwoven (1), wherein the tensile load-carrying yarns (2) extend in a warp direction of the nonwoven (1).

2. A textile composite material according to claim 1, characterized in that a cross sectional area of the tensile load-carrying yarns (2) is 4 to 50 mm$^2$.

3. A textile composite material according to claim 1, characterized in that a distance between the tensile load-carrying yarns (2) is 1 to 100 mm.

4. A textile composite material according to claim 1, characterized in that the tensile load-carrying yarns (2) are made of split polypropylene yarn.

5. A textile of composite material according to claim 1, further comprising a binding yarn (3), with which the tensile load-carrying yarns (2) are Raschel-knitted, knitted or sewed to the nonwoven (1), and which consists of split polypropylene yarn.

6. A textile composite material according to claim 1, characterized in that the tensile load-carrying yarns (2) are Raschel-knitted to the nonwoven (1) in pairs, the distance between pairs of yarns being 1 to 100 mm.

7. A textile composite material according to claim 1, characterized in that the nonwoven (1), the tensile load-carrying yarns (2) and a binding yarn (3), with which the tensile load-carrying yarns (2) are knitted, sewed or Raschel-knitted, are made of polypropylene.

* * * * *